United States Patent [19]
Ehrhardt

[11] 3,760,647
[45] Sept. 25, 1973

[54] TRANSMISSION SHIFT CONTROL

[75] Inventor: Benonie C. Ehrhardt, Park Forest, Ill.

[73] Assignee: Allis-Chalmers Corporation, Milwaukee, Wis.

[22] Filed: Nov. 28, 1972

[21] Appl. No.: 310,159

[52] U.S. Cl. .............................. 74/485, 74/473 SW
[51] Int. Cl. ............................................. G05g 7/02
[58] Field of Search .............. 74/485, 484, 473 SW, 74/491, 486, 473 R

[56] References Cited
UNITED STATES PATENTS

| | | | |
|---|---|---|---|
| 309,125 | 12/1884 | Best | 74/491 |
| 2,694,943 | 11/1954 | Brumbaugh | 74/473 R |
| 3,417,635 | 12/1968 | Day et al. | 74/484 |

*Primary Examiner*—Milton Kaufman
*Attorney*—Charles L. Schwab

[57] ABSTRACT

A manual shift handle for a vehicle transmission is pivotally mounted on the steering column and extends to the left side thereof for operation by the left hand of the operator. This arrangement frees the operator's right hand for manipulation of hydraulic valve levers and the like. Fore and aft pivotal movement of the left hand shift handle will select the same transmission speeds or directions as would be selected by corresponding fore and aft movement of a standard right hand lever installed on the transmission control rod. This is achieved by a motion reversing mechanism between the left hand shift handle and the transmission control rod.

4 Claims, 4 Drawing Figures

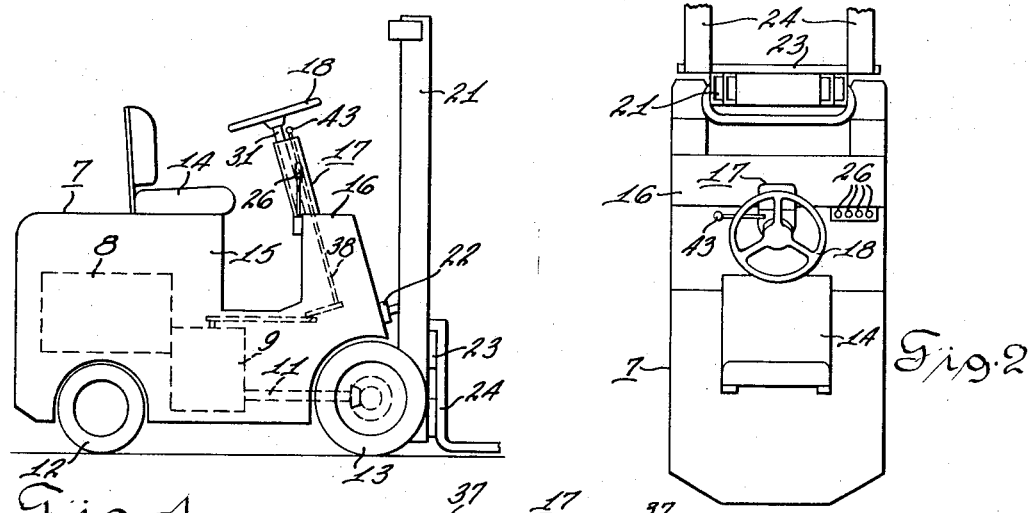
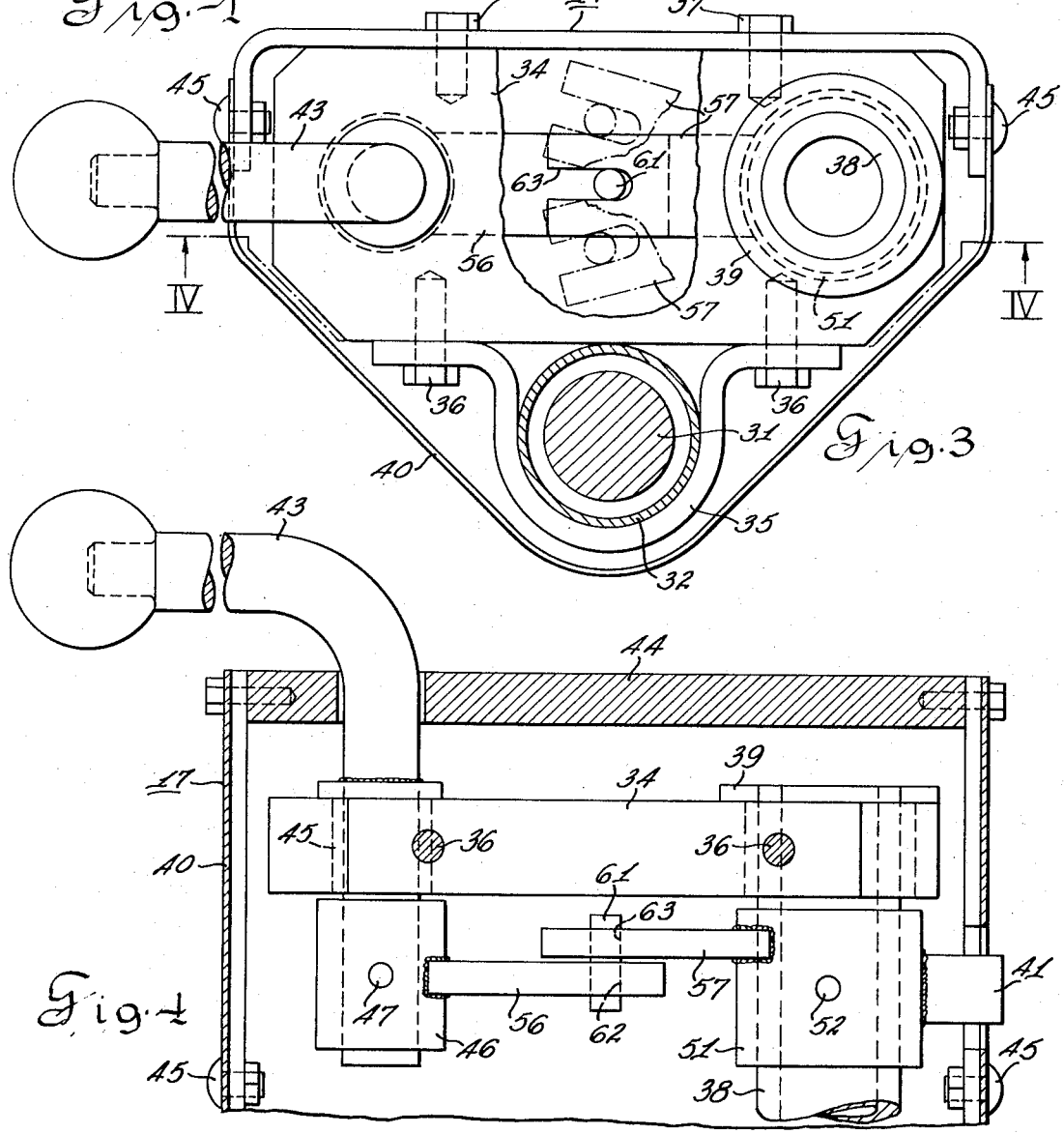

3,760,647

TRANSMISSION SHIFT CONTROL

BACKGROUND OF THE INVENTION

In material handling vehicles the control levers for the hydraulic valves are normally placed at the right side of the operator's seat or at the right side of the control panel as viewed by the operator. It has heretofore also been customary to utilize a steering column transmission shift control lever which extends to the right of the steering column. Accordingly, when the operator wishes to shift the transmission and also operate the control valve for the material handling tool, he finds that it is only convenient to use his right hand to accomplish both these functions. While the control valve levers can be placed on the left side of the operator in some material handling vehicles, the right-handed operator prefers to operate these critical control components with his right hand because he feels more confident of exacting movement therewith.

BRIEF DESCRIPTION OF THE INVENTION

In a material handling vehicle such as a lift truck, the transmission is controlled through a steering column transmission control mechanism which normally has the manual gear shift lever extending outwardly to the right of the steering column as viewed by the operator seated in the operator's seat. In the present invention, an alternate manual transmission control handle is mounted so as to extend to the left of the steering column, as viewed from the operator's seat, and a special motion reversing mechanism is employed to transmit pivotal movement of the alternate transmission control handle to the transmission control rod. In so doing, the forward movement of the alternate handle at the left side of the steering column will produce the same transmission adjustment as would be produced by the standard manual gear shift lever attached to the transmission control rod and extending to the right of the steering column. This is desirable in order to give the operator the same basic feel of the transmission control. By providing a shift handle extending from the left side of the steering wheel column, the operator will use his left hand to control the transmission, thereby leaving his right hand free to operate the control levers for hydraulic valves and the like.

BRIEF DESCRIPTION OF THE DRAWINGS

The invention is incorporated in a lift truck as illustrated by the sheet of patent application drawings in which:

FIG. 1 is a side view of a lift truck in which the present invention is incorporated;

FIG. 2 is a top view of the lift truck shown in FIG. 1;

FIG. 3 is a top view of the steering column with parts broken away to show details of the present invention; and FIG. 4 is a view taken along the line IV—IV of FIG. 3.

DETAILED DESCRIPTION OF THE INVENTION

Referring to FIGS. 1 and 2, the lift truck 7 in which the present invention is incorporated includes a pair of rear steer wheels 12 and a pair of front drive wheels 13 receiving power from an engine 8 through a transmission 9 and drive shaft 11. The truck 7 is provided with an operator's seat 14 at a central location on the truck and a control panel 16 in front of the operator's seat which includes an upstanding steering column 17 which in turn supports a steering wheel 18. A vertical mast 21 is pivotally connected by means, not shown, at its lower end to the frame 15 of the truck 7 for swinging movement about a transverse axis. Such movement is effected by operation of a pair of hydraulic tilt jacks 22, one of which is shown. The mast 21 includes a vertically reciprocatable carriage 23 on which a pair of lift forks 24 are mounted. The carriage 23 is raised and lowered by a lift jack, not shown, of conventional construction. The lift jack and tilt jacks 22 are controlled by hydraulic valves operated by two of the manual control levers 26 pivotally mounted on the right side of the operator as viewed in FIG. 2.

Heretofore, it has been customary to provide a steering column transmission control mechanism with a manual control lever extending from the right side of the steering column 17. In FIG. 4 such a control lever has been cut off with only a stub portion 41 remaining. Referring to FIGS. 1 and 3, the steering wheel 18 is connected to a steering shaft 31 which extends downwardly through a tube 32 secured to a support block 34 by a bracket 35 and cap screws 36. The lower end of the steering shaft 31 is connected to suitable steering gear, not shown, for imparting steering motion to the steer wheels 12 upon rotation of the steering wheel 18. The support block 34 is rigidly secured to the steering column 17 by caps screws 37 and an inspection panel 40 is releasably secured to the steering column 17 by releasable fastening means 45. Referring also to FIG. 4, a transmission control rod 38 is disposed in generally parallel relation to the steering shaft 31 and is pivotally supported in the support block 34 by a sleeve bearing 39. The transmission control rod 38 extends downwardly alongside the steering shaft 31 and connects to appropriate transmission control valves, not shown, for the forward-reverse transmission 9. In the usual lift truck construction the transmission control rod 38 would have a manual shift lever secured thereto for rotation therewith and extending outwardly laterally to the right, as viewed in FIGS. 2, 3 and 4.

In accordance with the present invention an alternate manual shift control handle 43 is provided which extends laterally to the left of the steering column 17. In this position the shift control handle 43 may be operated with the left hand, thereby freeing the right hand for operation of the control levers 26. This not only makes it more convenient to operate the truck and its controls, but increases the speed and efficiency of operation of the various lift truck operations. The manual shift handle 43 extends downwardly through an opening in a top plate 44 and is pivotally connected to and supported by the support block 34 through a suitable sleeve bearing 45. The lower end of the manual shift handle 43 carries a sleeve 46 secured thereto by a pin 47 which is disposed in transversely spaced relation to a sleeve 51 secured to the transmission control rod by a pin 52. A pivotal motion reversing means is interposed between the manual control lever 43 and the transmission control rod 38 in the form of a pair of intermeshing parts 56, 57 which are secured by welding to the sleeves 46, 51. The parts 56, 57 extend transversely toward one another and have ends which intermesh to transmit pivotal motion. In the illustrated embodiment of this motion reversing mechanism, a generally vertically disposed pin 61 is press fit in a drilled opening 62 adjacent the free end of the part 56 and the free end of the part 57 has walls defining an open ended slot or groove 63 which is dimensioned to receive the upstanding pin 61. This pivotal motion reversing mechanism may be considered to be a tongue and groove type connection wherein the pin 61 constitutes the tongue element and the groove 63 constitutes the groove element. As clearly shown in FIG. 4, the parts 56, 57 are juxtaposed one above the other.

From the foregoing description of the present invention, it is apparent that a novel transmission control handle is provided which extends from the left side of the steering console or column 17 thereby freeing the operator's right hand for manipulation of the control valve levers 26. The pivotal motion reversing mechanism comprising parts 56, 57 allows the handle 43 to move the control rod 38 for the transmission in the same pivotal direction as it would be moved by corresponding fore and aft movement of the conventional transmission control handle if attached to part 41. This optional left hand control gives the operator the same directional feel as the usual right hand control.

The embodiments of the invention in which an exclusive property or privilege is claimed are defined as follows:

1. A steering column transmission control mechanism for a motor vehicle comprising:
   a steering shaft
   a fixed support for said steering shaft,
   a transmission control rod rotatably mounted on said support alongside said steering shaft and adapted for connection to a manual transmission control lever extending laterally therefrom at one transverse side of said support,
   a manual transmission shift control handle pivotally connected to said support and extending laterally outward at the other transverse side of said support, and
   pivotal motion reversing means interconnecting said control handle and said control rod.

2. The invention of claim 1 wherein said pivotal motion reversing means includes a first part rigidly secured to said handle and extending toward said control rod and a second part rigidly secured to said control rod and extending toward said handle, said first and second parts having intermeshing ends thereon operable to cause said control rod to pivot in one direction of rotation on pivotal movement of said handle in the opposite direction of rotation.

3. The invention of claim 2 wherein one of said intermeshing ends presents a groove and the other of said intermeshing ends presents a tongue extending into and in motion transmitting engagement with said groove.

4. The invention of claim 3 wherein said parts are positioned one above the other and said tongue is a pin extending into said groove.

* * * * *